April 5, 1966  W. J. BRINK  3,243,881
NAVIGATIONAL INSTRUMENT
Filed May 9, 1963  2 Sheets-Sheet 1
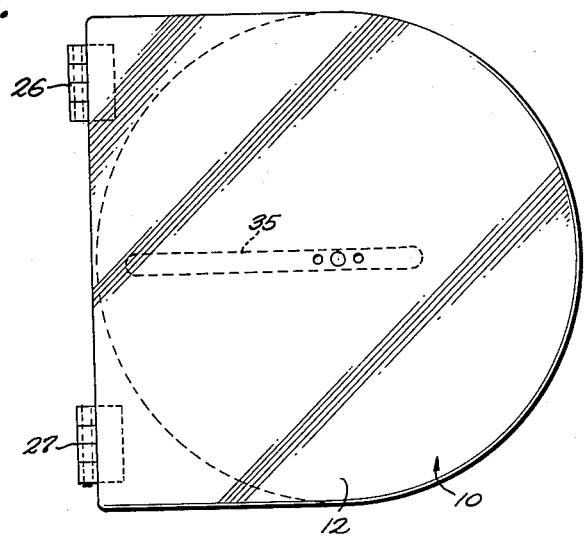
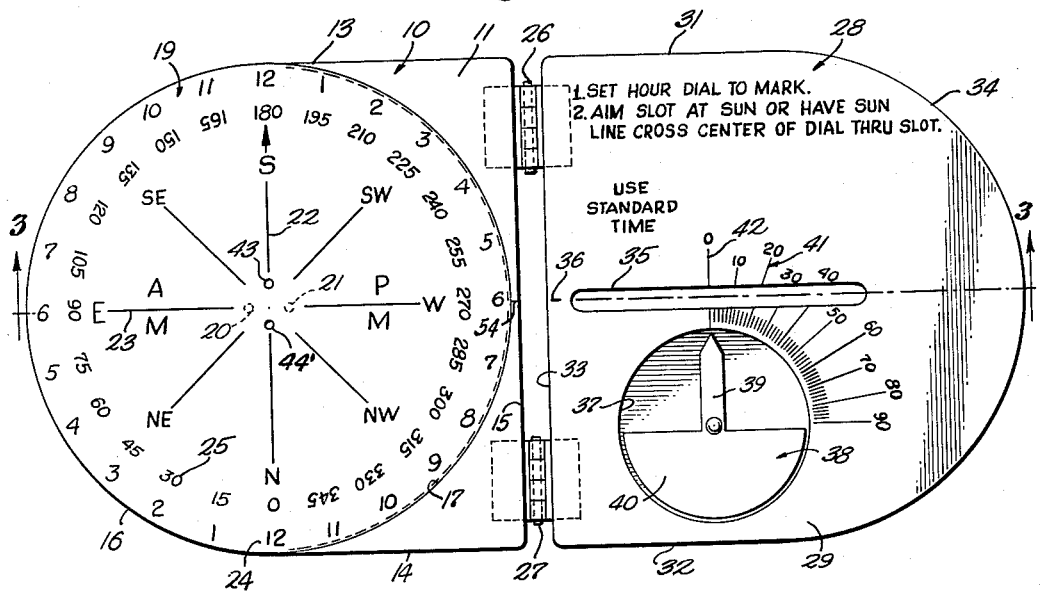
INVENTOR
William J. Brink
BY Mason, Fenwick & Lawrence
ATTORNEYS April 5, 1966 W. J. BRINK 3,243,881
NAVIGATIONAL INSTRUMENT
Filed May 9, 1963 2 Sheets-Sheet 2
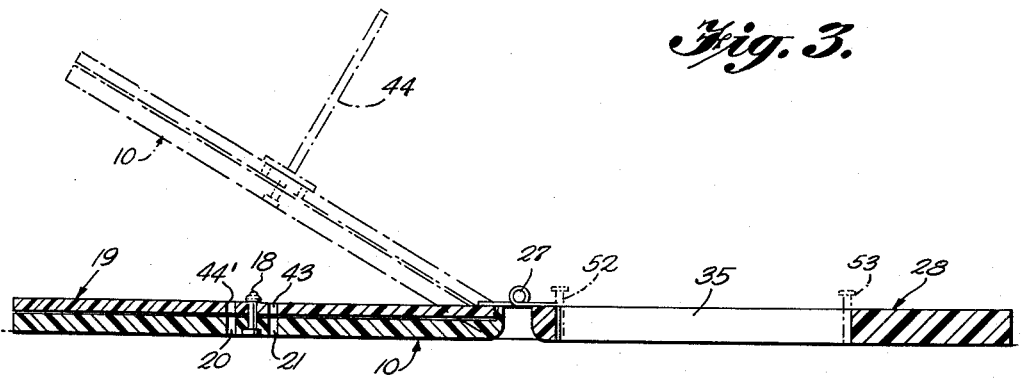
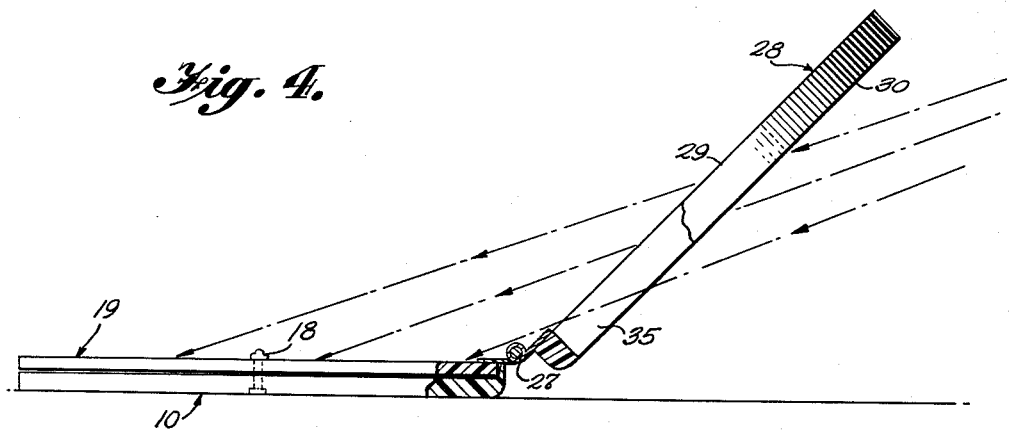
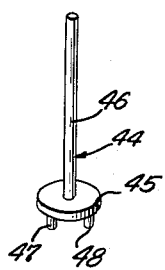
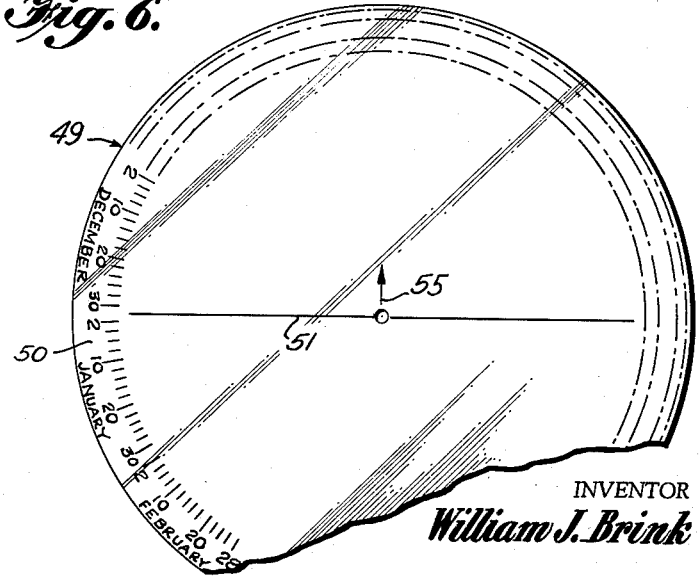
INVENTOR
William J. Brink
BY
Mason, Fenwick & Lawrence
ATTORNEYS

United States Patent Office 3,243,881
Patented Apr. 5, 1966

3,243,881
NAVIGATIONAL INSTRUMENT
William J. Brink, Bainbridge Island, Wash.
(4929 Purdue Ave. NE., Seattle, Wash. 98105)
Filed May 9, 1963, Ser. No. 279,183
14 Claims. (Cl. 33—61)

This invention relates to a navigational instrument and more particularly to a portable navigational instrument suitable for determining direction, time, latitude and longitude with the aid of celestial bodies.

In the art of navigation there are various known methods for determining the fundamental elements of navigation including direction, time, latitude and longitude. However, most of such known methods which provide a comparatively high degree of accuracy usually require relatively complicated and expensive instruments, in addition to access to involved navigational tables and a considerable knowledge of methods of calculation utilizing such tables and of astronomy in general. Of those known methods requiring less complicated navigational instruments, the data obtainable is usually not very accurate, which also may be undesirable.

Accordingly, the general object of this invention is to provide an improved navigational instrument.

Another object of this invention is to provide an improved navigational instrument suitable for determining direction, time, latitude and longitude with the aid of celestial bodies.

A further object of this invention is to provide an improved navigational instrument suitable for determining direction, time, latitude and longitude which is simple to use and which does not require a considerable knowledge of astronomy, the use of complicated calculations or reference to involved navigational tables.

A still further object of this invention is to provide an improved portable navigational instrument which is suitable for determining direction, time, latitude and longitude quickly with a relatively high degree of accuracy.

Another object of this invention is to provide an improved navigational instrument suitable to be used as a sun dial for determining either time or direction, regardless of the position of the sun either north or south of the equator.

A further object of this invention is to provide a navigational instrument suitable for determining direction, time, latitude and longitude which is simple in construction and inexpensive to manufacture.

Further objects and advantages of the present invention will become apparent as the following description proceeds when taken in conjunction with the drawings which accompany and form a part of this specification wherein:

FIGURE 1 is a bottom plan view of the invention in the closed position;

FIGURE 2 is a top plan view of the invention in the opened position;

FIGURE 3 is a sectional view taken along line 3—3 of FIGURE 2, also showing the base member thereof in broken lines in position when the invention is used as a sun dial for determining time;

FIGURE 4 is a side view of the invention in position when the invention is used as a sun dial for determining direction, having portions thereof broken away;

FIGURE 5 is a perspective view of a gnomon used with the invention; and

FIGURE 6 is a top plan view of a date dial used with the invention for determining longitude, having a portion thereof broken away.

Referring to the drawings, the present invention includes a base plate member 10 formed of any suitable translucent material having parallel top and bottom surfaces 11 and 12, parallel side edges 13 and 14, a rear edge 15 disposed perpendicular to the side edges and a semicircular front edge 16. The top surface 11 of the base plate member 10 is formed with a circular recess providing a semicircular shoulder 17 having a radius equal to the radius of the front edge 16. The center of the circular recess in the base plate member is provided with an axle member 18 having an interference tip, which extends above the plane of the top surface 11. The axle member 18 is adapted to receive a flat disc or dial member 19, also formed of a suitable translucent material, having a thickness equal to the depth of the circular recess in the top surface 11 and a radius equal to the radius thereof so that the dial member is adapted to rotate freely in the circular recess with the top surface thereof being coplanar with the top surface 11 of the base plate member. The base plate member 10 is also provided with a pair of holes 20 and 21 which are equally spaced from the axle member 18 and which lie on a line passing through the center of the circular recess, parallel to the side edges 13 and 14.

The dial member 19 is provided with a pair of coordinate axes 22 and 23 intersecting at right angles at the center thereof, having the respective segments of axis 22 provided with north and south designations and the segments of axis 23 provided with east and west designations. Disposed along the periphery of the dial member is a first circular scale 24 divided into twenty-four major divisions, with each major division further divided into four sub-divisions (not shown). The major sub-divisions are numbered 1 to 12, beginning with the major division in alignment with the south segment of the north-south axis and continuing clockwise to the north segment thereof. The major divisions of circular scale 24 continue to be numbered 1 through 12 in the clockwise direction beginning with the north segment of the north-south axis. Circular scale 24 being divided into twenty-four major divisions, represents the hours of the day, having the left-hand side of the dial designated as the morning hours, a.m., and the right side of the dial designated as the evening hours, p.m., as illustrated in FIGURE 2. The dial member 19 also is provided with a second circular scale 25 disposed concentric with the first circular scale 24. The second circular scale 25 is divided into twenty-four major divisions, with each of such major divisions being divided into fifteen minor divisions (not shown) representing the degrees of a circle. Beginning with the north segment of the north-south axis which also is aligned with the 12:00 p.m. marking on the first circle scale 24, the major increments are numbered clockwise every fifteen degrees.

Hingedly connected to the base plate member 10 along the rear edge 15 thereof by means of a pair of hinges 26 and 27 is a cover plate member 28 having substantially the same shape as the base plate member 10. The cover plate member 28 comprises parallel top and bottom surfaces 29 and 30, parallel side edges 31 and 32, a rear edge 33 disposed perpendicular to the side edges 31 and 32 and a front semi-circular edge 34. The cover plate member 28 is suitably hinged to the base plate member 10 so that it may be swung in the closed position as shown in FIGURE 1, wherein the top surface 29 thereof rests on the top surface 11 of the base plate member 10 and the top surface of dial member 19, or can be swung open and downwardly relative to the plane of the top surface of the base member at least 90° for purposes as will later be described. The cover plate member is provided with a slot 35 disposed parallel to the side edges 31 and 32 thereof and in alignment with a diameter of the dial member 19. Disposed perpendicular to the rear edge 33 of the cover plate member and in a plane passing through the center and perpendicular to the plane of rotation thereof is a reference mark 36 suitably scribed on the top surface 29. The top surface 29 of the cover plate member also is provided with a circular recess 37 having rotatably mounted therein an inclinometer 38 comprising a pointer portion 39 and a weighted portion 40. The inclinometer 38 is adapted to freely rotate within the recess 37 to indicate the angle of inclination of the side edges 31 and 32 of the cover plate member on a quadrant scale 41 having a datum line 42 radiating from the circular recess 37 relative to the center thereof and disposed parallel to the rear edge 33 of the cover plate member. The scale 41 is divided into nine major divisions numbered 0 through 90 every 10°, with each major division having five subdivisions.

The dial member 19 is provided with a pair of diametrically opposed holes 43 and 44', each spaced an equal distance from the center thereof and disposed on the north-south axis 22 so that when the south segment thereof is aligned with the reference mark 36 in the cover plate member, the holes 43 and 44 will register with the holes 20 and 21 in the base plate member, respectively, to receive a gnomon 44, as shown in FIGURE 5. The gnomon 44 comprises a circular base portion 45 having a centrally disposed upstanding portion 46 and a pair of downwardly projecting leg portions 47 and 48 which are diametrically opposed relative to the axis of the upstanding portion 46, each being disposed radially from the axis of the upstanding portion 46 a distance equal to the radial distance of each of the holes 20 and 21 from the center of dial member 19.

The height of the axle member 18 is made sufficiently high so that a second disc or dial member 49 as shown in FIGURE 6, may be mounted thereon for rotation on the dial member 19. The dial member 49 preferably has a diameter equal to the diameter of dial member 19 and is provided with a circular scale 50 disposed circumferentially thereon, being graduated into suitable divisions representing the days of a year. Each of the months are designated on circular scale 50, beginning with January and extending counterclockwise from a diametrically disposed reference line 51, passing through the center of the dial and intersecting the scale at the January 1st and July 1st reference marks.

For determining direction during those months when the sun is north of the equator the invention is first opened in the horizontal position as shown in FIGURE 2 and the dial member 19 is rotated and set so that the observer's local time on circular scale 24 is aligned with the reference mark 36 on the cover plate member. With the dial member 19 set with respect to the local time, the operator then turns toward the sun, lifting the cover plate member upwardly and aims the same toward the sun so that the sun's rays are permitted to pass through the slot 35 onto the dial member 19, as shown in FIGURE 4. When the sun line crosses the center of the dial member 19, the directions shown in the circular scale 25 of the dial member 19 are substantially correct. However, by determining the latitude as will hereinafter be described, and tilting the north-south axis 22 on dial member 19, the number of degrees equal to the complement of the latitude angle, a more correct reading is obtained. For further accuracy, additional correction can be made for longitude as determined by the time meridian, also utilizing the equation of time factor.

During the months when the sun is south of the equator, a similar procedure is followed for determining direction, except that the cover plate member is lowered below the plane of the dial member 19 so that the sun-line then crosses the center of the dial through the bottom of the base plate member and is read while looking from the top of the dial member 19. It will be noted that the transparent properties of the dial member 19 and the base plate member 10 permit such a procedure.

In using the present invention as a sun dial for determining local time, a north-south line is scribed on a suitable horizontal surface where there is exposure to the sun throughout the daylight hours. The north-south line may be found by utilizing the invention as hereinbefore described. With a north-south line having been scribed on a suitable surface, the invention in the open position is placed on the horizontal surface and the slot 35 is aligned with the scribed north-south line and fixed into such position by a pair of tacks 52 and 53, as shown in FIGURE 3 or any other suitable means. The dial member 19 is then rotated and set so that the south segment of the north-south axis 22 is aligned with the slot 35 and reference mark 36 and the holes 43 and 44' thereof are in registry with the holes 20 and 21, respectively, of the base plate member. The gnomon is then inserted in the registered holes in the dial member 19 and the base plate member 10, and the center of the shadow thereof cast on the circular scale 24 is the exact local time. In order to obtain a narrow shadowline it will be necessary to tilt the base plate member 10 upwardly, as shown in FIGURE 3. During the months when the sun is north of the equator, the gnomon is placed on the top of the dial member 19 and during the months when the sun is south of the equator the gnomon is placed on the bottom of the base plate member 10, which would necessitate utilizing a suitable horizontal surface where it is possible for the slot in the cover plate member to be disposed in alignment with a suitable north-south line and the gnomon to project downwardly relative to such horizontal surface.

To determine latitude with the use of the present invention, the cover plate member 28 is opened in the position as shown in FIGURE 2, so that the members are substantially in alignment and the side edge 13 of the base plate member and the side edge 31 of the cover plate member form substantially a continuous sighting edge. The invention in such a position is then held up with both hands and the star Polaris is sighted along the continuous plane of the side edges 13 and 31. When Polaris has thus been sighted, the pointer 39 of the inclinometer 38 will point to the correct latitude on the scale 41 provided on the top surface of the cover plate member. Normally, when sighting Polaris the cover plate member will be supported by the right hand so that it will be convenient for the inclinometer to be pressed by the thumb to fix the setting of pointer portion 39 thereof.

For determining longitude with the present invention, either of two methods may be employed to obtain an accurate reading, including a first method which involves the observation of the relative position of Polaris and the Big Dipper, and a second method which involves the measurement of the included angle between a last known north-south line determined by means as hereinbefore described and an evening Polaris line. According to the first method of determining longitude, the invention is opened in the position as shown in FIGURE 2 and held vertically so that the side edges thereof are horizontal. Then locating the center of the Big Dipper, taken to be the star Alioth, the dial member 19 is rotated so that the north segment of the north-south axis points to the star Alioth. The dial member 49 is then placed on the dial member 19, with the dial member 19 held in the described setting and the dial member 49 is rotated and set so that the reference line 51 of the date dial is aligned with a reference mark 54 disposed on the top surface 11 of the base plate member in alignment with the reference mark 36, and the radially disposed arrow 55 provided on the top surface of the date dial 49 points upwardly. The date is then located on the circular scale 50 on the date dial 49 and where it intersects the circular scale 24 of the dial member 19 below the date dial is the local mean time of the observer. By thus noting the time indicated on the circular scale 24, the observer's longitude can be determined by the use of a watch set at local mean time and knowing the local zone of the observer. If the observer's watch time is more than the time observed on the circular scale 24 and the observer is in west longitude, the observer's position is west of the central meridian of the local zone and conversely, if the observer's watch time is less than the time indicated on the hour scale 24, the position of the observer is east of the central meridian of the local zone. To precisely calculate the exact longitude of the observer either east or west of the central meridian of the local zone, the difference between the indicated time and the observer's watch time is divided by 4 to provide the number of degrees to either side of the central meridan and the number of degrees is either added or subtracted to the longitude of the central meridan of the local zone, depending on whether the indicated time from the instrument is greater or less than the observer's watch time. The above method of determining longitude is primarily based on the use of local mean time, although it is understood that the same method can be practiced with the use of Greenwich mean time by well-known conversion methods.

According to the second method of determining longitude with the present invention, it will be appreciated that Polaris provides an almost perfect north reference point which is relatively easy to find. As previously indicated, this second method involves the measurement of the included angle between a last known north-south line made with the invention in the manner as hereinbefore described and an evening Polaris line. Either at dawn or dusk when both the sun and the stars of first magnitude are visible, a sun line is made in accordance with the earlier described procedure. A Polaris line is then made to intersect the sun line so that the sun line and the Polaris line intersect to form an angle. The included angle is then measured by removing the dial member 19 from the base plate member and placing the same over the intersecting lines and reading the included angle from the degree scale 25. The number of degrees of the angle is then either added or subtracted from the central meridian of the observer's local zone to calculate the longitude.

It will thus be appreciated that the present invention can be used for determining either direction, time, latitude, or longitude quickly and accurately without an extensive knowledge of celestial navigation or a considerable knowledge of astronomy. It further will be appreciated that the method of using the invention is relatively simple and that the invention is also simple in construction, making it inexpensive to manufacture.

From the foregoing detailed description it will be evident that there are a number of changes, adaptations and modifications of the present invention which come within the province of those skilled in the art. However, it is intended that all such variations not departing from the spirit of the invention, be considered as within the scope thereof as limited solely by the appended claims.

What I claim is:

1. A navigational instrument comprising a base member, a cover member hingedly attached to said base member, a disc member rotatably mounted on said base member, said disc member having a first circular scale graduated into suitable divisions representing the time of day, said disc member having a second circular scale graduated into suitable divisions representing the degrees of a circle disposed concentric with said first circular scale and said cover member having a narrow slit disposed in a plane passing through the center and perpendicular to the plane of rotation of said disc member.

2. A navigational instrument comprising a base member formed of a translucent material, a cover member hingedly attached to said base member, a disc member formed of a translucent material rotatably mounted on said base member, said disc member having a first circular scale graduated into suitable divisions representing the time of day, said disc member having a second circular scale graduated into suitable divisions representing the degrees of a circle disposed concentric with said first circular scale and said cover member having a narrow slit disposed in a plane passing through the center and perpendicular to the plane of rotation of said disc member.

3. A navigational instrument comprising a base member formed of a translucent material, a cover member hingedly attached to said base member, a disc member formed of a translucent material rotatably mounted on said base member, said disc member having a first circular scale graduated into suitable divisions representing the time of day, said disc member having a second circular scale graduated into suitable divisions representing the degrees of a circle disposed concentric with said first circular scale, said cover member having a narrow slit disposed in a plane passing through the center and perpendicular to the plane of rotation of said disc member and said base member having a reference mark disposed radially adjacent the periphery of said disc member and lying in the plane passing through the center and perpendicular to the plane of rotation of said disc member.

4. A navigational instrument comprising a base member formed of a translucent material, a cover member hingedly attached to said base member so that it may be swung open 270° relative to a top surface of said base member, a disc member formed of a translucent material rotatably mounted on said top surface of said base member, said disc member having a pair of perpendicular axes intersecting at the center thereof representing north-south and east-west coordinates, said disc member having a first circular scale graduated into twenty-four major divisions with each major division graduated into four sub-divisions, said major divisions of said first circular scale being numbered 1 through 12 beginning with the south segment of said north-south axis extending clockwise and continuing clockwise 1 through 12 from the north segment of said north-south axis, said disc member having a second circular scale graduated into three hundred sixty divisions disposed concentric with said first circular scale, said divisions of said second circular scale being suitable numbered beginning with the north segment of said north-south axis and extending clockwise, said cover member having a narrow slit disposed in a plane passing through the center and perpendicular to the plane of rotation of said disc member and said base member having a reference mark disposed radially adjacent the periphery of said disc member and lying in a plane passing through the center and perpendicular to the plane of rotation of said disc member.

5. A navigational instrument comprising a base member formed of a translucent material having a bottom surface, a cover hingedly attached to said base member, a disc member formed of a translucent material having a top surface rotatably mounted on said base member, said top surface of said disc member having a first circular scale graduated into suitable divisions representing the time of day, said top surface of said disc member having a second circular scale graduated into suitable divisions representing the degrees of a circle disposed concentric with said first circular scale, said cover having a narrow slit disposed in a plane passing through the center and perpendicular to the plane of rotation of said disc member, a gnomon, and said gnomon having means for detachably securing the same selectively to one of said surfaces of said members in alignment with the axis of rotation of said disc member.

6. A navigational instrument comprising a base member formed of a translucent material having a bottom surface, a disc member formed of a translucent material having a top surface rotatably mounted on said base member, said disc member having a pair of perpendicular axes intersecting at the center thereof representing north-south and east-west coordinates, said disc member having a first circular scale graduated into twenty-four major divisions with each major division graduated into four sub-divisions, said major divisions of said first circular scale being numbered 1 through 12 beginning with the south segment of said north-south axis extending clockwise and continuing clockwise 1 through 12 from the north segment of said north-south axis, said disc member having a second circular scale graduated into three hundred sixty divisions disposed concentric with said first circular scale, said divisions of said second circular scale being suitable numbered beginning with the north segment of said north-south axis and extending clockwise, a cover member hingedly attached to said base member so that it may be swung open 270° relative to said top surface of said disc member, said cover member having a narrow slit disposed in a plane passing through the center and perpendicular to the plane of rotation of said disc member, said base member having a reference mark disposed radially adjacent the periphery of said disc member and lying in a plane passing through the center and perpendicular to the plane of rotation of said disc member, a gnomon, and said gnomon having means for detachably securing the same selectively to one of said surfaces of said members in alignment with the axis of rotation of said disc member.

7. A navigational instrument comprising a base member formed of translucent material, a disc member formed of a translucent material rotatably mounted on said base member, said disc member having a pair of perpendicular axes intersecting at the center thereof representing north-south and east-west coordinates, said disc member having a first circular scale graduated into twenty-four major divisions with each major division graduated into four sub-divisions, said major divisions of said first circular scale being numbered 1 through 12 beginning with the south segment of said north-south axis extending clockwise and continuing clockwise 1 through 12 from the north segment of said north-south axis, said disc member having a second circular scale graduated into three hundred sixty divisions disposed concentric with said first circular scale, said divisions of said second circular scale being suitably numbered beginning with the north segment of said north-south axis and extending clockwise, a cover member hingedly attached to said base member so that it may be swung open 270° relative to the top surface of said disc member, said cover member having a narrow slit disposed in a plane passing through the center and perpendicular to the plane of rotation of said disc member, said base member having a reference mark disposed radially adjacent the periphery of said disc member and lying in a plane passing through the center and pendicular to the plane of rotation of said disc member, said disc member having a pair of diametrically opposed holes disposed on said north-south axis each equidistant from the center of said disc member, said base member having a pair of diametrically opposed holes disposed realtive to the axis of rotation of said disc member in a plane passing through said slot in said cover member and perpendicular to the plane of rotation of said disc member, each of said holes in said base member being radially disposed from the axis of rotation of said disc member a ditsance equal to the radial distance of said holes in said disc member whereby said disc member may be rotatably adjusted so that said holes in said disc member register with said holes in said base member, a gnomon comprising a base portion, an upstanding portion and a pair of downwardly projecting leg portions depending from said base portion, said downwardly projecting leg portions being diametrically opposed relative to the axis of said upstanding portion and each disposed radially from the axis of said upstanding portion a distance equal to the radial distance of each of said holes in said disc member from the center of said disc member.

8. A navigational instrument comprising a base member formed of a translucent material, a cover member hingedly attached to said base member, a disc member formed of a translucent material rotatably mounted on said base member, said disc member having a first circular scale graduated into suitable divisions representing the time of day, said disc member having a second circular scale graduated into suitable divisions representing the degrees of a circle disposed concentric with said first circular scale, said base member and said cover member each having a side edge being coplanar so that said edges form a continuous sighting plane when said base member and said cover member are aligned, the plane of said edges being perpendicular to the axis of the hinged connection between said base member and said cover member, said cover member having means for indicating the inclination of the plane of said edges relative to the horizontal and said cover member having a narrow slit disposed in a plane passing through the center and perpendicular to the plane of rotation of said disc member.

9. A navigational instrument comprising a base member formed of a translucent material, a cover member hingedly attached to said base member, a disc member formed of a translucent material rotatably mounted on said base member, said disc member having a first circular scale graduated into suitable divisions representing the time of day, said disc member having a second circular scale graduated into suitable divisions representing the degrees of a circle disposed concentric with said first circular scale, said base member and said cover member having coplanar side edges providing a continuous sighting plane when said base member and said cover member are disposed in alignment, the plane of said edges being perpendicular to the axis of the hinged connection between said base member and said cover member, said cover member having an inclinometer rotatably mounted thereon comprising a pointer portion and a diametrically opposed weighted portion, said cover plate member having an arcuate scale having a datum line disposed radially relative to the center of rotation of said inclinometer and perpendicular to the plane of said edges, said arcuate scale graduated into suitable divisions representing an arc of 90° and said cover member having a narrow slit disposed in a plane passing through the center and perpendicular to the plane of rotation of said disc member.

10. A navigational instrument comprising a base member formed of a translucent material, a cover member hingedly attached to said base member so that it may be swung open 270° relative to a top surface of said base member, a disc member formed of a translucent material rotatably mounted on said top surface of said base member, said base member having a pair of perpendicular axes intersecting at the center thereof representing north-south and east-west coordinates, said disc member having a first circular scale graduated into twenty-four major divisions with each major division graduated into four sub-divisions, said major divisions of said first circular scale being numbered 1 through 12 beginning with the south segment of said north-south axis extending clockwise and continuing clockwise 1 through 12 from the north segment of said north-south axis, said disc member having a second circular scale graduated into three hundred sixty divisions disposed concentric with said first circular scale, said divisions of said second circular scale being suitably numbered beginning with the north segment of said north-south axis and extending clockwise, said base member and said cover member having coplanar side edges providing a continuous sighting plane when said base member and said cover member are disposed in alignment, the plane of said edges being perpendicular to the axis of the hinged connection between said base member and said cover member, said cover member having a circular recess, an inclinometer rotatably mounted on said cover member within said recess comprising a pointer portion and a diametrically opposed weighted portion, said cover plate member having an arcuate scale disposed adjacent the periphery of said circular recess having a datum line disposed radially relative to the center of rotation of said inclinometer and perpendicular to the plane of said edges, said arcuate scale being graduated into suitable divisions representing an arc of 90°, said cover member having a narrow slit disposed in a plane passing through the center and perpendicular to the plane of rotation of said disc member and said base member having a reference mark disposed radially adjacent the periphery of said disc member and lying in a plane passing through the center and perpendicular to the plane of rotation of said disc member.

11. A navigational instrument comprising a base member, a cover member hingedly attached to said base member, a first disc member rotatably mounted on said base member, said first disc member having a first circular scale graduated into suitable divisions representing the time of day, said disc member having a second circular scale graduated into suitable divisions representing the degrees of a circle disposed concentric with said first circular scale, a second disc member formed of a translucent material rotatably mountable on said first disc member, said second disc member having a circular scale graduated into suitable divisions representing the days of the year, said disc member having a diametrically disposed reference line intersecting the circular scale thereof at the January 1st and July 1st markings, said cover member having a narrow slit disposed in a plane passing through the center and perpendicular to the plane of rotation of said first disc member and said base member having a reference mark disposed radially adjacent the periphery of said first disc member and lying in the plane passing through the center and perpendicular to the plane of rotation of said first disc member.

12. A navigational instrument comprising a base member formed of a translucent material, a cover member hingedly attached to said base member so that it may be swung open at least 270° relative to a top surface of said base member, a first disc member formed of a translucent material rotatably mounted on said top surface of said base member, said first disc member having a pair of perpendicular axes intersecting at the center thereof representing north-south and east-west coordinates, said first disc member having a first circular scale graduated into twenty-four major divisions with each major divisions graduated into four sub-divisions, said major divisions of said first circular scale being numbered 1 through 12 beginning with the south segment of said north-south axis extending clockwise and continuing clockwise 1 through 12 from the north segment of said north-south axis, said first disc member having a second circular scale graduated into three hundred sixty divisions disposed concentric with said first circular scale, said divisions of said second circular scale being suitably numbered begining with the north segment of said north-south axis and extending clockwise, a second disc member formed of a translucent material rotatably mountable on said first disc member, said second disc member having a circular scale graduated into suitable divisions representing the days of the year, said second disc member having a diametrically disposed reference line intersecting the circular scale thereof at the January 1st and July 1st markings, said cover member having a narrow slit disposed in a plane passing through the center and perpendicular to the plane of rotation of said first disc member and said base member having a reference mark disposed radially adjacent the periphery of said first disc member and lying in a plane passing through the center and perpendicular to the plane of rotation of said first disc member.

13. A navigational instrument comprising a base member formed of a translucent material, a cover member hingedly attached to said base member, a first disc member formed of a translucent material rotatably mounted on said base member, said first disc member having a first circular scale graduated into suitable divisions representing the time of day, said first disc member having a second circular scale graduated into suitable divisions representing the degrees of a circle disposed concentric with said first circular scale, a second disc member formed of a translucent material rotatably mountable on said first disc member, said second disc member having a circular scale graduated into suitable divisions representing the days of the year, said second disc member having a diametrically disposed reference line intersecting the circular scale thereof at the January 1st and July 1st markings, said base member and said cover member each having a side edge being coplanar so that said edges form a continuous sighting edge when said base member and said cover member are aligned, the plane of said edges being perpendicular to the axis of the hinged connection between said base member and said cover member, said cover member having means for indicating the inclination of the plane of said edges relative to the horizontal and said cover member having a narrow slit disposed in a plane passing through the center and perpendicular to the plane of rotation of said first disc member.

14. A navigational instrument comprising a base member formed of a translucent material, a cover member hingedly attached to said base member so that it may be swung open 270° relative to a top surface of said base member, a first disc member formed of a translucent material rotatably mounted on said top surface of said base member, said base member having a pair of perpendicular axes intersecting at the center thereof providing north-south and east-west coordinates, said first disc member having a first circular scale graduated into twenty-four major divisions with each major division graduated into four sub-divisions, said major divisions of said first circular scale being numbered 1 through 12 beginning with the south segment of said north-south axis and extending clockwise and continuing clockwise 1 through 12 from the north segment of said north-south axis, said first disc member having a second circular scale graduated into three hundred sixty divisions disposed concentric with said first circular scale, said divisions of said second circular scale being suitably numbered beginning with the north segment of said north-south axis and extending clockwise, a second disc member formed of a translucent material rotatably mountable on said first disc member, said second disc member having a circular scale graduated into suitable divisions representing the days of the year, said second disc member having a diametrically disposed reference line intersecting the circular scale thereof at the January 1st and July 1st markings, said base member and said cover member having coplanar side edges providing a continuous sighting edge when said base member and said cover member are disposed in alignment, the plane of said edges being perpendicular to the axis of the hinge connection between said base member and said cover member, said cover member having a circular recess, an inclinometer rotatably mounted on said cover member within said recess comprising a pointer portion and a diametrically opposed weighted portion, said cover plate member having an arcuate scale disposed adjacent the periphery of said circular recess having a datum line disposed radially relative to the center of rotation of said inclinometer and perpendicular to the plane of said edges, said arcuate scale being graduated into suitable divisions representing an arc of 90°, said cover member having a narrow slit disposed in a plane passing through the center and perpendicular to the plane of rotation of said first disc member and said base member having a reference mark disposed radially adjacent the periphery of said first disc member and lying in a plane passing through the center and perpendicular to the plane of rotation of said first disc member.

(References on following page)

References Cited by the Examiner

UNITED STATES PATENTS

| | | | |
|---|---|---|---|
| 441,777 | 12/1890 | Simmons | 33—62 |
| 2,432,958 | 12/1947 | Wenzel | 33—61 |
| 2,567,139 | 9/1951 | Wenz. | |

FOREIGN PATENTS

| | | |
|---|---|---|
| 607,597 | 1/1935 | Germany. |
| 2,920 | 1896 | Great Britain. |

ROBERT B. HULL, *Primary Examiner.*